United States Patent [19]

Murphy

[11] Patent Number: 4,639,074
[45] Date of Patent: Jan. 27, 1987

[54] FIBER-WAVEGUIDE SELF ALIGNMENT COUPLER

[75] Inventor: Edmond J. Murphy, Bethlehem, Pa.

[73] Assignee: AT&T Bell Laboratories, Murray Hill, N.J.

[21] Appl. No.: 621,453

[22] Filed: Jun. 18, 1984

[51] Int. Cl.⁴ .............................................. G02B 6/36
[52] U.S. Cl. .............................. 350/96.15; 350/96.20
[58] Field of Search ............. 350/96.15, 96.20, 96.12, 350/96.13, 96.14

[56] References Cited

U.S. PATENT DOCUMENTS

| | | | |
|---|---|---|---|
| 4,088,386 | 5/1978 | Hawk | 350/96.21 |
| 4,102,561 | 7/1978 | Hawk et al. | 350/96.21 |
| 4,164,363 | 8/1979 | Hsu | 350/96.17 |
| 4,184,741 | 1/1980 | Hawk et al. | 350/96.20 |
| 4,186,997 | 2/1980 | Schumacher | 350/96.21 |
| 4,217,032 | 8/1980 | Sheem | 350/96.21 |
| 4,474,425 | 10/1984 | Kaede | 350/96.16 |

OTHER PUBLICATIONS

"Optical Waveguide Cable Connection", Applied Optics, vol. 15, No. 11, Nov. 1976, Thiel et al., pp. 2785-2791.
"Multiport Coupling Between Single Mode . . ." Topical Mtg. on Integrated and Guided Wave Devices, Jan. 16-18, 1977, Hsu et al., pp. WD6/1-4.
"High-Efficiency Flip-Chip . . ." Appl. Phys. Lett., vol. 37, No. 4, Aug. 1980, Bulmer et al., pp. 351-353.
"Single-Mode Fiber-to-Channel . . ." J. Opt. Comm., vol. 2, No. 4, 1981, Ramer, pp. 122-127.
"Experimental Integrated Optic Circuit . . ." IEE J. Quantum Electrons, vol. QE-17, No. 6, June 1981, Ramer et al., pp. 970-974.
"Fabrication of Flip-Clip . . . ", IEEE Trans. on Comp. Hybrids and Manuf. Tech., vol. CHMT-4, No. 4, Dec. 1981, Bulmer et al., pp. 350-355.

Primary Examiner—William L. Sikes
Assistant Examiner—Akm E. Ullah
Attorney, Agent, or Firm—Wendy W. Koba

[57] ABSTRACT

An optical fiber-to-waveguide coupler is disclosed which automatically aligns five of the six possible degrees of freedom associated with the alignment process. Silicon v-grooves (22) are used to hold the fibers (24) in place in the silicon substrate (20), but in contrast to prior art arrangements, the silicon substrate overlaps the top surface (12) of the waveguide substrate (14). A cover plate (26) disposed over the silicon substrate is cut and polished so that the endface of the cover plate (28) lies in the same plane as the ends of the fibers (30). When the endface of the cover plate is butted against the endface (16) of the waveguide substrate, and the silicon v-grooves have been etched to the proper predetermined depth, five of the six degrees of freedom are automatically aligned.

7 Claims, 5 Drawing Figures

FIBER-WAVEGUIDE SELF ALIGNMENT COUPLER

BACKGROUND OF THE INVENTION

1. Field of the Invention

The present invention relates to a fiber-waveguide self alignment technique and, more particularly, to an alignment technique wherein one or more fibers are held in silicon V-grooves and mated in an overlap fashion with the waveguide substrate such that five of the six possible degrees of freedom are automatically aligned.

2. Description of the Prior Art

Packaging has become a key issue in evaluating the manufacturability and reliability of optical devices. A significant part of the packaging problem is due to the stringent alignment tolerances required for coupling between the devices and optical fibers. To date, most applications (i.e.; lasers, detectors) have required the alignment of only a single fiber. However, with the advent of integrated optical devices, the need has arisen to align linear arrays of fibers to devices. One prior art technique for accomplishing array alignment is disclosed in U.S. Pat. No. 4,217,032, issued to S. K. Sheem on Aug. 12, 1980. The Sheem technique utilizes a two-dimensional, intersecting groove pattern formed in a silicon substrate wherein a groove in one direction is deeper than an intersecting groove, and an alignment fiber rests in the deep groove. The shallow groove accommodates an optical fiber, where the optical fiber is sized to contact the alignment fiber. The alignment fiber is tapered so that as it slides along the groove, it raises or lowers the optical fiber to a level which yields the maximum optical transmission. This alignment technique becomes extremely time consuming when a large array of optical fibers must be individually adjusted.

The coupling of a single mode optical fiber to a waveguide requires an extremely accurate alignment, much more so than is the case for multimode fibers. For example, for an amplitude half width at $e^{-1}$, a radial offset of one micron would result in an excess loss of 0.3 dB. U.S. Pat. No. 4,164,363 issued to H. Hsu on Aug. 14, 1979 discloses a single mode fiber-to-channel waveguide end-fire coupler. Here, a single mode fiber is held within a capillary tube and adjusted by a micropositioner for greatest light output. The fiber is then secured by an epoxy to one end of a channel waveguide. The two ends are then secured in place in a slot in the capillary tube which prevents rotation of the waveguide relative to the single fiber. As with the above-described Sheem arrangement, the Hsu technique requires active alignment, by monitoring and maximizing the optical transmission. This method also becomes extremely time consuming when a large array of fibers must be aligned.

An alternative alignment arrangement which does not require individual alignment is disclosed in U.S. Pat. No. 4,186,997 issued to W. L. Schumacher on Feb. 5, 1980. The Schumacher disclosure relates to a method and apparatus for connecting optical waveguides in coincident alignment, and features a connector divided into intermating sections, with each section in the form of an open box configuration provided with a projecting tongue for intermating with other waveguide sections. Schumacher, however, does not discuss fiber-waveguide interconnections, nor any method which reduces the number of degrees of freedom which must simultaneously be aligned.

There remains a need, therefore, for a fiber-waveguide alignment technique capable of aligning arrays of both multimode and single mode fibers which can simplify the alignment process, that is, which reduces the number of degrees of freedom which must be actively adjusted, that is, adjusted while monitoring and maximizing the optical transmission.

SUMMARY OF THE INVENTION

The present invention relates to a fiber-waveguide self alignment technique and, more particularly, to an alignment technique wherein one or more fibers are held in silicon V-grooves and mated in an overlap fashion with the waveguide substrate such that five of the six possible degrees of freedom associated with the fibers are automatically aligned.

It is an aspect of the present invention to provide an alignment technique which is equally applicable to both single mode and multimode fiber systems.

Another aspect of the present invention is to provide an alignment technique which can be utilized in association with both single fiber and fiber array systems.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

As discussed above, the advent of integrated optical devices has resulted in the need for a method to align linear arrays of optical fibers to devices which is a generic approach, applicable to single mode and multimode devices, lasers, detectors, active waveguide structures and passive waveguide structures. It is apparent that new techniques must also be developed which simplify the alignment process, reducing the number of degrees of freedom which must be actively adjusted. The present invention relates to such a method. Precision etched silicon chips are utilized, as with prior art arrangements, but the present technique relies on a novel lap joint between the silicon chip and the device substrate. The technique is equally applicable to single mode and multimode guided wave devices in glass, LiNbO$_3$ and semiconductor materials. The technique of the present invention does not require any special modification or processing of the waveguide substrate, and thus is not limited to chemically reactive substrates. Further, the present technique can be used with standard low eccentricity fibers or polarization preserving fibers having an elliptical outer cross-section.

Figure 1:
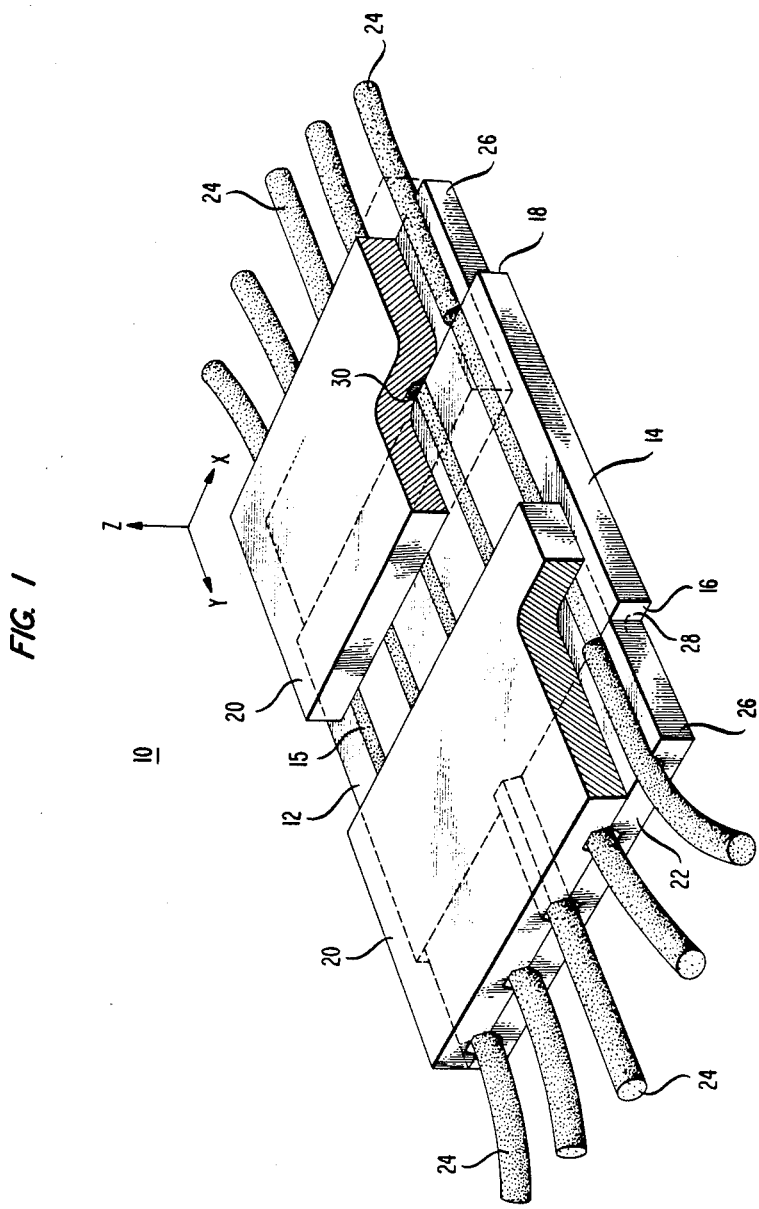
FIG. 1 illustrates a fiber-waveguide coupler formed in accordance with the present invention.

A fiber-waveguide coupler 10 formed in accordance with the present invention is illustrated in FIG. 1. The top surface 12 of a substrate 14 (i.e., the surface containing a plurality of waveguides 15) is defined as the reference surface. This is the surface of choice since, for a given set of fabrication conditions, the depth of the waveguide mode will always be positioned accurately with respect to this surface. If the bottom surface had been chosen, the thickness of both waveguide substrate 14 and silicon substrate 20 would have to be controlled to impractical tolerances.

Figure 2:
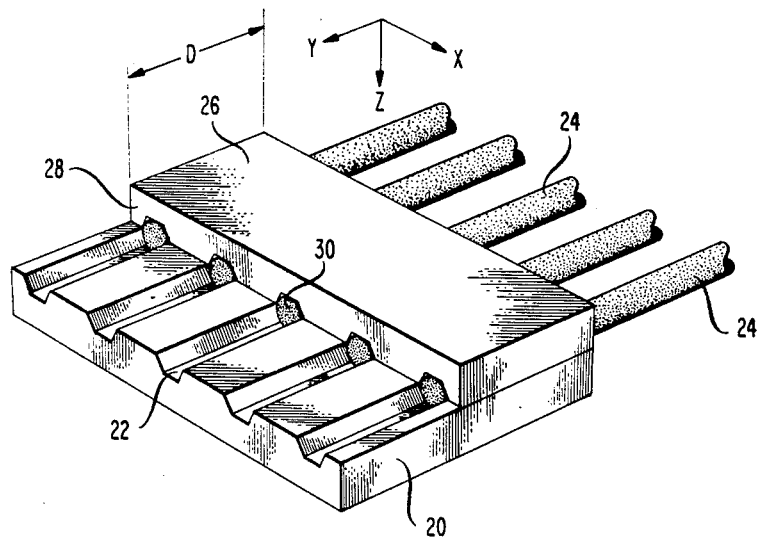
FIG. 2 illustrates the fiber portion of the coupler illustrated in FIG. 1.

The fiber-silicon chip array, illustrated in greater detail in FIG. 2, is designed in accordance with the present invention to overlap substrate surface 12 such that the fibers butt against an endface 16 of substrate 14. The present technique, as will be discussed in greater detail hereinafter, also positions the fiber cores at the correct distance below the reference surface to allow efficient coupling to the waveguides. Additionally, the depth of the fiber cores is controlled by the design of the silicon v-grooves. It is to be noted that the present technique is based on two critical precepts: first, a convenient reference plane (substrate surface 12) is identified and secondly, the fibers are held in precision etched silicon v-grooves.

The various pieces forming fiber-waveguide coupler 10 are assembled as follows. A pair of endfaces 16 and 18 of waveguide substrate 14 are cut and polished by any of the techniques well known in the art. Next, a fiber array utilizing a silicon substrate 20 is assembled, as shown in FIG. 2. A plurality of silicon v-grooves 22 are etched into silicon substrate 20 and an array of optical fibers 24 are positioned in v-grooves 22. Fiber array 24 is then clamped in place with a cover plate 26. Cover plate 26 may comprise quartz, Pyrex TM, silicon, or any other suitable material. Cover plate 26 is aligned so that its endface 28 is perpendicular to v-grooves 22 and such that it covers only part of the length denoted D, of silicon substrate 20. Fiber array 24 is positioned such that the ends 30 of the individual fibers all lie in the plane defined by endface 28 of cover plate 26. No adhesive is used at this point to hold fiber array 24 in place as the ends of the fibers and the overlapping part of silicon substrate 20 must be kept clean until the alignment process is complete. Finally, the complete fiber array assembly is positioned on substrate 14, as shown in FIG. 1, such that silicon substrate 20 lays flat on waveguide substrate surface 12 and endface 28 of cover plate 26 butts against the endface of waveguide substrate 14. After alignment, UV curing cement is applied which flows into v-grooves 22 and is subsequently cured by exposure through substrate 14 and cover plate 26. Alternatively, thermal curing epoxy may be utilized to bond fiber array 24.

In order to demonstrate that the present technique eliminates the need for aligning most of the degrees of freedom, a set of coordinates must be defined as shown in FIGS. 1 and 2. The x and y coordinates are defined in the plane of top surface 12 of substrate 14 with y along the length of waveguides 15 and x across the width of waveguide substrate 14. Z is perpendicular to this plane and $\theta_x$, $\theta_y$, $\theta_z$ are rotations about the respective axes. The y and $\theta_z$ positions are completely determined by butting the endfaces of coverplate 26 and waveguide substrate 14 together while z, $\theta_x$ and $\theta_y$ are determined by butting the overlapping part of silicon substate 20 with the top surface 12 of waveguide substrate 14. Thus, only the transverse alignment, x, need be done actively.

Figure 3:
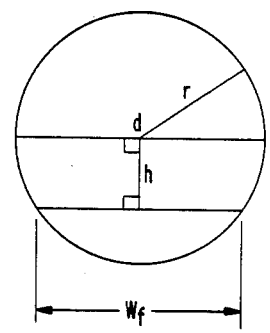
FIGS. 3 and 4 illustrate a cross-sectional view of an exemplary fiber and groove, respectively.
Figure 4:
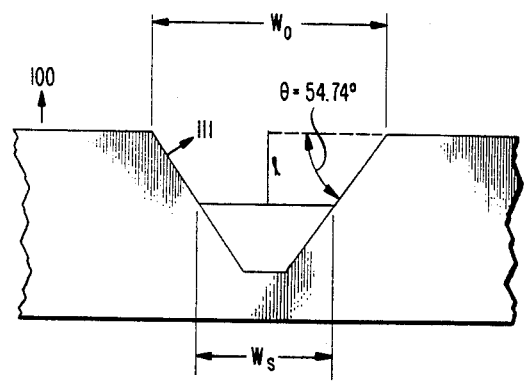
Figure 5:
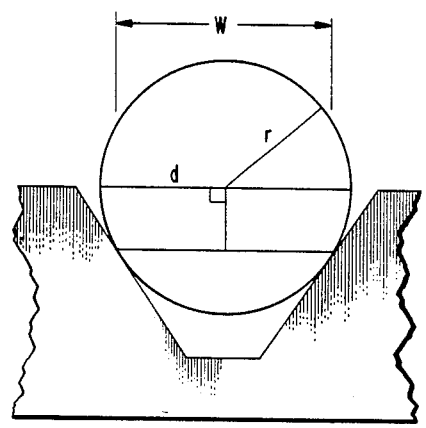
FIG. 5 illustrates a cross-section of an exemplary fiber positioned in a groove in accordance with the present invention.

In order to effect the alignment method of the present invention, silicon v-grooves 22 must be precisely designed. FIGS. 3 and 4 define the parameters which are necessary to described the position of an exemplary fiber 24 in an exemplary v-groove 22. The fiber parameters, as shown in FIG. 3, are: d, the diameter of the fiber; r, the radius; and $w_f$, the width of the fiber at some distance, h, from its center. The lines of length d and $w_f$ are parallel to each other and at right angles to the line of length h. The groove parameters, illustrated in FIG. 4, include: $w_o$, the width at the top surface; $\theta$, the crystallographically defined angle for the 100 crystal orientation (57.47°); and $w_s$, the width of the groove at some distance, l from the surface. Again, the lines of length $w_o$ and $w_s$ are parallel to each other and at right angles to the line of length l. Fiber 24 is placed in groove 22, as shown in FIG. 5, with d parallel to w, and its position determined by resting on the groove walls at $w_f = w_s$. It is to be noted that the fiber does not rest on the bottom surface of the groove. Since it is known that the shape of the groove is determined by a preferential crystallographic etch, only the quantities $w_o$ and the etch depth must be specified to completely determine the groove parameters.

In association with FIGS. 3 and 4, the following relations can be made:

$$\frac{w_f^2}{4} + h^2 = r^2; \text{ and} \quad (1)$$

$$w_s = w_o - \frac{2l}{\tan\theta} = w_o - \sqrt{2}\, l \quad (2)$$

In accordance with the present invention, it is necessary that the center of the fiber lies at the surface of the silicon. Therefore, l=h, $w_s = w_f \equiv w$ and $$\frac{w_o - w}{\sqrt{2}} = hr^2 - \frac{w^2}{4} h^{\frac{1}{2}} \quad (3)$$

which is quadratic in w. The solutions for w are given by:

$$w = \frac{2w_o \pm [4w_o^2 - 6[w_o^2 - 2r^2]]^{\frac{1}{2}}}{3} \quad (4)$$

The two solutions to equation (4) correspond to the fiber touching the walls of the groove at two different values of w and, therefore, two different values of h. This corresponds to a physically unrealizable situation since for one set of values of h and w, the fiber would sit partially outside the groove wall. To eliminate this problem, the second term in the numerator of equation (4) must be zero, yielding $$w_o = \sqrt{6}\, r \quad (5)$$

Equation 5 defines the required etch mask opening which will position the center of the fiber at the top surface of the chip for any given radius. Note that $w_o = 1.22d$, so that the minimum center to center spacing (i.e., the closest packed linear fiber array) is determined by $w_o$, not by d.

In accordance with the present self alignment technique, the fiber center must be positioned at some height $\Delta$ above the silicon chip surface so that it will overlap with the waveguide mode field pattern. Therefore, $h = l = \Delta$ and, in analogy to the derivation of equation (5), $$w_o + \sqrt{2}\,\Delta = \sqrt{6}\,r \tag{6}$$

Therefore, for a given r and a desired $\Delta$, equation (6) can be utilized to calculate the required etch mask opening $w_o$.

What is claimed is:

1. An optical fiber to waveguide coupler comprising
a first substrate containing at least one optical waveguide longitudinally disposed along a top surface thereof, at least one endface of said first substrate perpendicular to said top surface;
a second substrate including at least one longitudinal groove, each groove capable of containing an optimal fiber; and
a cover plate disposed to partially cover said second substrate and said at least one optical fiber located therein, an endface of said cover plate lying in the same plane as an endface of said at least one optical fiber, said cover plate endface connected to said first substrate endface such that said second substrate overlaps a portion of said top surface of said first substrate and said at least one optical fiber is aligned with said at least one optical waveguide.

2. An optical fiber to waveguide coupler in accordance with claim 1 where
the first substrate contains a plurality of longitudinally disposed optical waveguides; and
the second substrate includes a plurality of grooves, each groove capable of containing an optical fiber.

3. An optical fiber to waveguide coupler in accordance with claims 1 or 2 where
the at least one groove is formed as a v-groove to hold the at least one optical fiber in a predetermined relationship with the top surface of the first substrate.

4. An optical fiber to waveguide coupler in accordance with claim 3 where
the at least one groove is defined by a width $w_o$ and the at least one optical fiber is defined by a radius r, related by the equation $w_o + \sqrt{2}\Delta = \sqrt{6}r$, where $\Delta$ is defined as the distance between the center of said at least one optical fiber and the top surface of the first substrate.

5. An optical fiber to waveguide coupler in accordance with claims 1 or 2 where the first substrate is lithium niobate, the second substrate is silicon, and the cover plate is quartz.

6. An optical fiber to waveguide coupler in accordance with claims 1 or 2 where the at least one fiber is a multimode fiber.

7. An optical fiber to waveguide coupler in accordance with claims 1 or 2 where the at least one fiber is a single mode fiber.

* * * * *